United States Patent
Lindenberg

[15] 3,663,305
[45] May 16, 1972

[54] METHOD OF MANUFACTURING A STORAGE BATTERY

[72] Inventor: Hans-Georg Lindenberg, Hannover-Stocken, Germany

[73] Assignee: Varta Aktiengesellschaft, Frankfurt am Main, Germany

[22] Filed: Oct. 21, 1969

[21] Appl. No.: 868,035

[30] Foreign Application Priority Data

Oct. 24, 1968 Germany .................. P 18 04 800.5

[52] U.S. Cl. ..................................... 136/176, 136/134 R
[51] Int. Cl. ...................................................... H01m 5/00
[58] Field of Search ...................... 136/176, 134, 175

[56] References Cited

UNITED STATES PATENTS 3,253,962  5/1966  Deprill et al. .................... 136/134 R
3,386,860  6/1968  Maier ............................... 136/134 R
3,416,969  12/1968  Halsall ............................. 136/134 R
3,441,448  4/1969  Hayward et al. ................. 136/176
3,444,920  5/1969  McAlpine et al. ................ 136/175
3,484,300  12/1969  Sundberg ........................ 136/176

Primary Examiner—Donald L. Walton
Attorney—Michael S. Striker

[57] ABSTRACT

Method of manufacturing a battery in which the cells are initially interconnected by means of a transverse connecting member and are then confined within a battery casing. The cells are separated from each other by a partition wall in the casing which includes a cutout through which the connecting member extends with clearance. This clearance is injection molded with a plastic material and a cover is subsequently bonded to the top of the battery casing.

8 Claims, 5 Drawing Figures

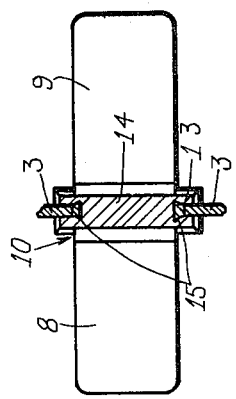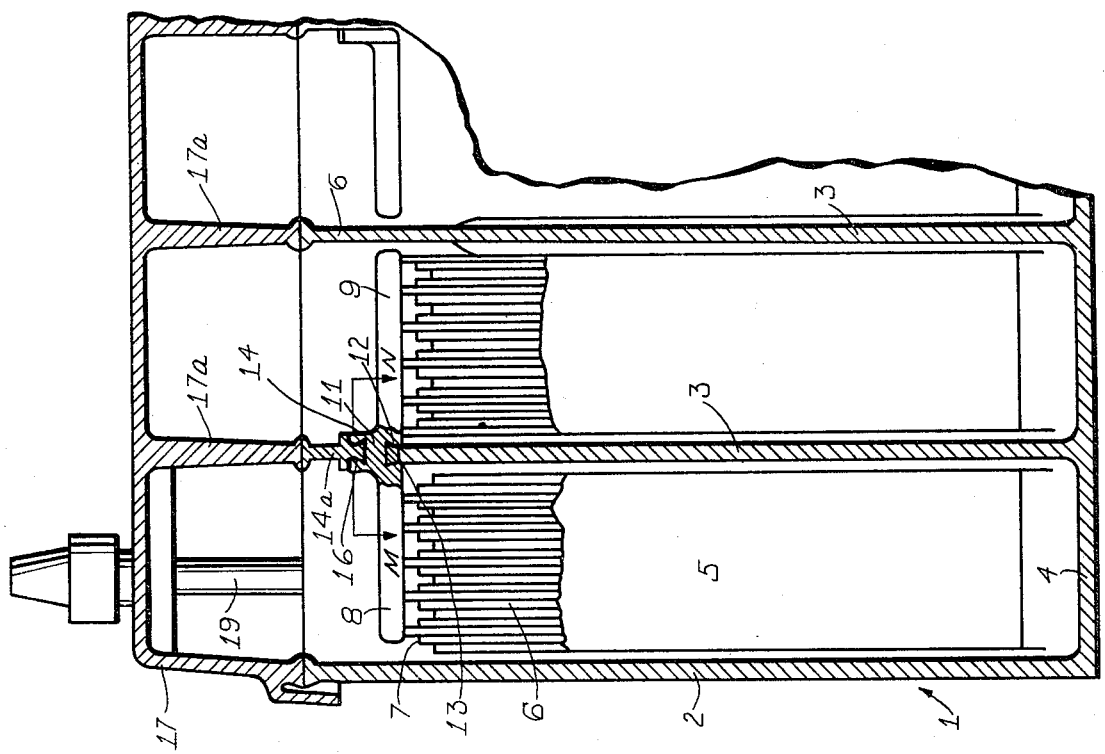

Patented May 16, 1972

INVENTOR
HANS GEORG LINDENBERG
BY
ATTORNEY

METHOD OF MANUFACTURING A STORAGE BATTERY

BACKGROUND OF THE INVENTION

The present invention in general relates to a method of manufacturing a battery and more in particular to an improvement in the electrical interconnections between the respective cells of the battery.

It is already known to provide storage batteries with an intercell connection which is effected through the partition wall within the battery casing. This insures a relatively small overall height of the battery, a relatively short circuit path, and is economical as regards the use of lead.

However, batteries with such intercell connections require a positive seal between the partition wall and the electric intercell connectors extending therethrough so as to avoid undesirable interaction between the electrolytic substances contained in the respective adjacent cells.

One such known intercell connection within the battery is made by inserting discrete connecting members, which are already electrically connected to the respective straps of each two adjacent cells, into recesses formed in the partition wall and electrically welding the L-shaped contact ends of the connecting members together in the region of the recesses.

Of particular disadvantage with this arrangement is the fact that (1) openings have to be formed in the partition walls, and (2) the possible damage inflicted on the walls as a result of the excessive heat occurring during the welding process to interconnect the respective lead connections in the walls.

A further intercell connection within the battery is made by superimposing molds onto the respective straps of each two adjacent cells and with the molds in substantially engaging abutment with the holes at opposite sides thereof and by subsequently interconnecting the respective ends of the mold by means of a liquid lead.

Also with this arrangement, the partition walls are negatively subjected to excessive heat which quite often results in leaky seals between the respective cells.

Still further known are connections of the type indicated above and in which the partition walls are formed with trapezoid cut-outs in which the electrical cell interconnectors are placed. The cover of the battery, in this case, is provided with corresponding trapezoid projections which, upon interconnection of the cells, are bonded with an adhesive material in the cut-outs in the walls.

This arrangement, however, requires a complicated battery cover arrangement and further has the disadvantage that such interconnection of the cells is mechanically unreliable. In addition, by using a battery casing from a non-adhesive material, as is often the case with modern battery-manufacturing techniques, the latter bonding arrangement is unsuitable.

SUMMARY OF THE INVENTION

Object of the present invention is to provide an electrical intercell connection through the partition wall within the battery which overcomes the above disadvantages and provides a positive intercell connection and seal between the partition wall and the interconnecting member.

A further object of the present invention is to provide a method to manufacture a battery with such an electrical intercell connection and which comprises forming two electrode assembly plates and forming an electric connection between the electrode units. The electric connection comprises an elongated electrically conductive bridge member having a center portion and two strap portions at opposite sides of the center portion with one of the strap portions connected to the plates of one electrode unit and with the other connected to the second electrode unit.

Preparing a battery case having at least two adjacent cell chambers with a partition wall separating the two chambers, the partition wall having an upper edge with a cut-out formed therein.

Introducing each of the electrode units into one of the chambers such that one of the strap portions of the bridge member extends at one side of the partition wall, the other of the strap portions extends at the other side of the partition wall, and the center portion of the bridge member extends with clearance through the cut-out in the partition wall.

Introducing a bonding material into the clearance so as to completely fill the same to thereby bond the center portion of the bridge member to the partition wall and simultaneously seal the chambers from each other, whereby the cut-out in the partition wall simultaneously is completely filled up with the bonding material, so that the upper edge of the partition wall does no longer possess any cut-out.

Welding a cover onto the battery case, the cover comprising an interior wall aligned with the partiton wall of the battery case and which is sealed to the partition wall and the outer walls of which are sealed to the outer walls of the battery case.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side elevational view of a completely assembled storage battery with part of the casing broken away to show the internal construction of an intercell connection made in accordance with the present invention;

FIG. 2a is a fragmental sectional view taken along line M–N of FIG. 1;

FIG. 4 shows an elevational view of part of a storage battery casing having two adjacent partition walls adapted to receive the electrical intercell connector of FIG. 2a.

DESCRIPTION OF THE PREFERRED EMBODIMENTS

Figure 2:
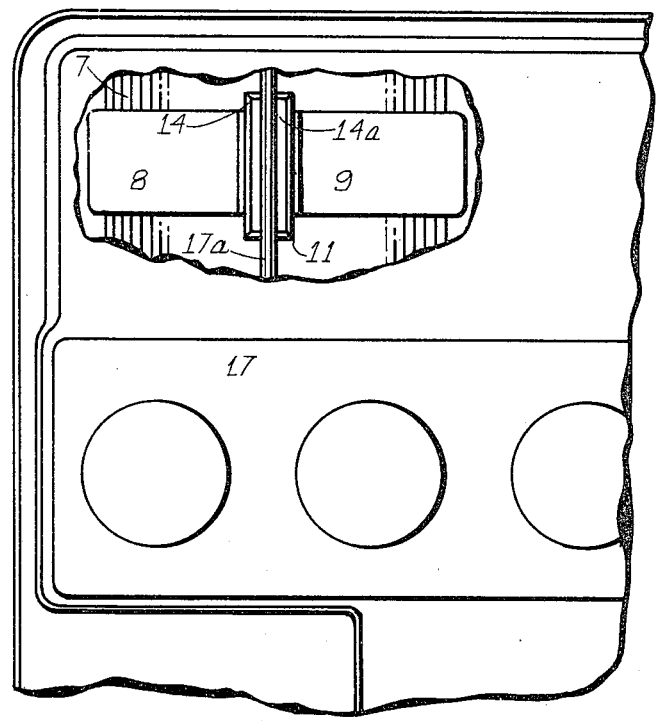
FIG. 2 is a top elevational view of the storage battery shown in FIG. 1 with part of the battery cover broken away to show the arrangement of the electrical intercell connector according to the present invention.

Referring now to the drawings in which like reference numerals index like parts, FIG. 1 shows a battery 1 having a casing 2 arranged with a plurality of parallel partition walls 3 which are molded integrally with the casing bottom 4 and form discrete cell chambers 5. The casing and partition walls are made from a plastic material. Suitable plastic materials are polypropylene, polyethylene and polystyrene.

A battery cell is mounted in each chamber 5 and each of the cells is seen to consist of a plurality of alternately arranged positive and negative plates, generally indicated with 6 and the separators indicated with 7.

Connected across the upper portions or lugs of either the positive or negative plates 6 of one cell, is one strap portion 8 while a second strap portion 9 is connected across the plates 6 of the adjacent cell.

The respective strap portions 8 and 9 as shown in FIGS. 1, 2 and 2a, are seen to form part of an elongated bridge member 10 which interconnects the respective cells and which further includes a center portion 11 intermediate the strap portions 8 and 9.

The center portion 11 is seen to be an enlargement provided with a circumferentially extending groove 12 which at the lower end of the enlarged center portion 11 is dove-tailed in shape.

The partition wall 3 at its upper edge is provided with a cut-out 13 in which the center portion 11 of the bridge member 10 is received upon initial assembly of the respective cells and interconnection thereof by the bridge member 10.

As shown, and in assembled condition, the peripheral edge of the cut-out 13 is received in the groove 12 at all sides of the enlargement or center portion 11, however, with the exception of the upper side 14 thereof.

The peripheral edge of the cut-out 13 is received in the groove 12 in such a way that a clearance is defined therebetween and which clearance is subsequently completely filled with a plastic material by means of a conventional injection molding process so as to positively bond the center portion 11 in the cut-out 13 and to thereby seal the same. The plastic material will be polypropylene, polyethylene or polystyrene.

The plastic material is also injection molded into the groove portion at the upper side 14 of the center portion 11 so as to completely fill the cut-out in the partition wall at 14a as shown in FIG. 1, the partition wall being then bonded to the battery cover, as will be shortly explained.

It is of advantage that before or shortly before injection molding of the plastic material into the clearance between the groove and the peripheral edge of the cut-out, pressure be applied laterally to the opposite sides of the center portion 11 and the top portion 14 thereof so as to create dove-tailed undercuts 15 and 16 of the groove 12 in the lateral and top portions of the center portion 11.

Object of such undercuts is to establish a positive mechanical connection between the groove 12 and the respective edges of the cut-out 13, and between the groove 12 and the filled-up part 14a of the partition wall.

It is of mechanical advantage that the cut-out 13 and the bridge member 10 at its center portion 11 thereof, have corresponding configurations, preferably rectangular or trapezoidal which improves the overall connection.

Following injection molding of the plastic material into the clearances between the groove 12 and the peripheral edge of the cut-out 13, and filling up of the partition wall at 14a, a cover 17, made of plastic, is placed onto and welded to the casing 2.

The cover 17 includes inner parallel walls 17a which extend axially with the partition walls 3 and which, in the assembled condition of FIG. 1, are welded to the partition walls.

Since the electrical bridge member 10 has been sufficiently heated during casting to the respective plate lugs of the cell groups, no additional heat is necessary during bonding of the same to the cut-out 13.

However, if too long a time lapse occurs between the casting of the interconnections of the cells and placing of the same in the casing 2, the electric bridge member 10 may be reheated prior to injection molding of the plastic material.

Figure 3:
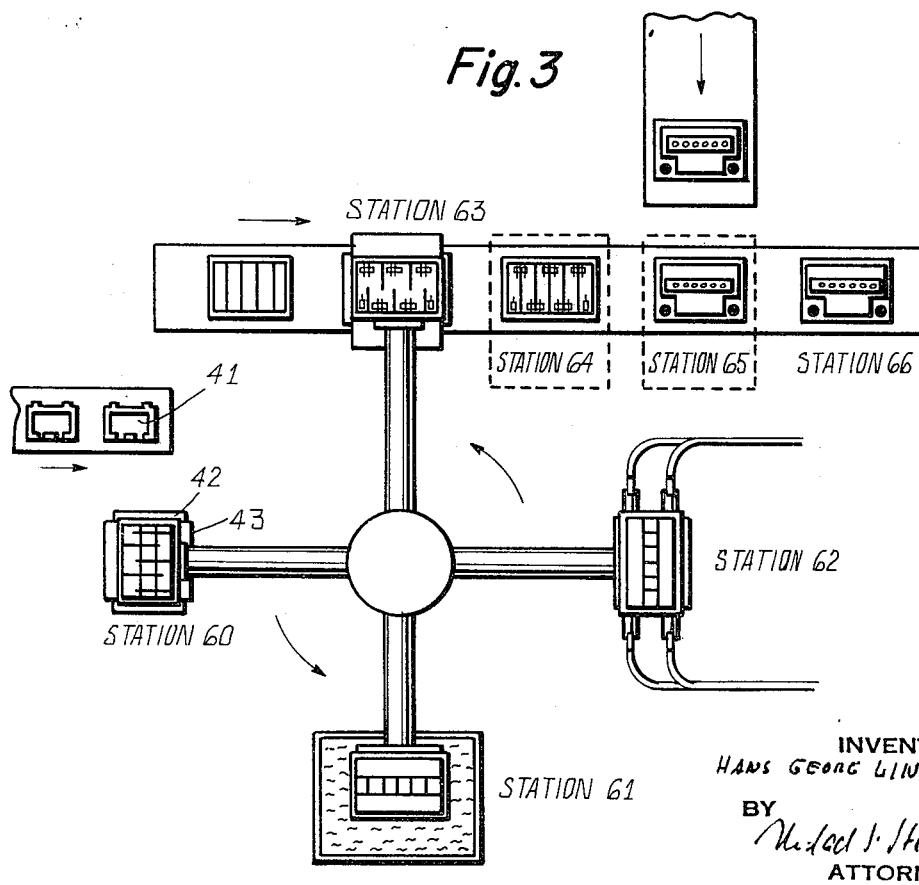
FIG. 3 diagrammatically shows the various manufacturing stages in an installation for manufacturing a battery incorporating the intercell connection in accordance with the present invention.

FIG. 3 illustrates the different stages of manufacturing a battery according to the present invention in a suitable continuous installation.

A plurality of battery plates formed into blocks 41 are transported to a first station 60 in which they are clampingly placed in a form box 42 in which they are placed in their correct order and aligned relative to each other. In this station, the lugs of the individual plates are oriented upwardly.

The form box 42 is placed on a rotatable table 43 which from station 60 is moved to station 61 in which the plates and the form box 42 are turned upside down. The lugs of plates with corresponding polarity which are to form one cell are then interconnected with all the lugs of plates of opposite polarity which are to form the second cell.

To provide these interconnections the lugs are dipped into a mold filled with liquid lead at station 62 so as to cast the interconnecting elongated bridge members 10. One strap connecting the positive or negative plates of the end-cells of the battery may at this station also be provided with an upstanding shaft which serves later for the forming of the terminal posts of the battery. With a six-cell battery all interconnections and shops with upstanding shafts will be molded together and the complete interconnected units are then inserted in the battery case.

At a further station 63, the thus interconnected cells are returned in their original position with the lugs oriented upwardly and are removed from the form box 42 and introduced into the battery casing 2.

In station 64, the plates 6 are formed into cells in the battery casing 2 by injection molding as hereinbefore explained and in station 65 the cover 15 is welded onto the battery casing 2. The edges of the outer and inner walls of cover and battery case are heated by heating elements and are then passed together and welded together.

Finally, in station 66, conventional terminal posts 19 are connected to the end cell chambers. These terminal posts 19 serve to externally connect the battery to a load, and one of which has been shown in FIG. 1.

Figure 4:
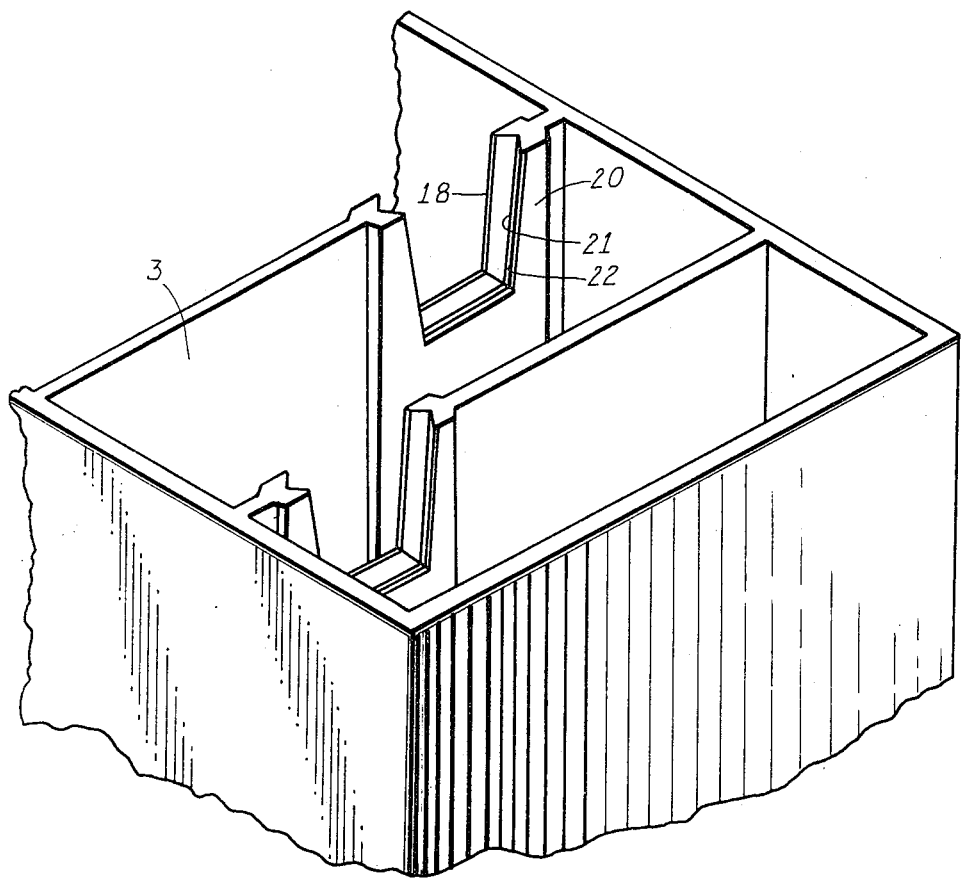

FIG. 4 shows a partition wall 3 which is seen to comprise a substantially rectangular cut-out 18 provided in the upper edge of the wall 3.

The wall 3 is provided with an enlargement 20 which at both sides of the wall surrounds the cut-out 18 and extends till the bottom of the partition wall 3. Arranged in the cut-out 18 is a circumferential groove or recess 21 which is preferably triangular in cross section, but may have a configuration other than triangular.

In this arrangement, the enlarged center portion 11 of the elongated electric bridge member 10 is received in the cut-out 18 such that the groove 12 of the center portion 11 clampingly compresses the adjoining walls 22 of the recess 21. A clearance is defined between the recess 21 and the groove 12 following insertion of the former into the latter.

This arrangement renders it possible to provide a positive seal between the partition wall 3 and the bridge member 10 and facilitates subsequent injection molding of the plastic material into the clearance.

In all other respects, interconnection of the cells and welding of the cover 17 onto the casing 2 is identical as that described with regard to FIG. 1.

From the above description it will be appreciated that the essential advantage obtained with the above described method essentially is characterized by a positive interconnection of the cells 6 and an hermatic seal between each two adjacent cell chambers 5, without any possibility of even slightly damaging the partition walls 3 or the casing 2, as was often the case with prior art methods due to uncontrollable heat exerted on the partition walls.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is:

1. A method of manufacturing a battery, comprising the steps of forming two electrode assembly units from a plurality of electrode plates, each of said plates being provided with a connecting lug, by aligning the respective plates of respective electrode units in a form box with said connecting lugs of said plates upwardly oriented and clamping said plurality of plates in said form box; forming an electrical connection between said electrode units, said electrical connection comprising an elongated electrically conductive bridge member having a center portion provided with an enlargement having a circumferential groove at least a portion of which is provided with a dove-tailed undercut and strap portions at opposite sides of said center portion with one of said strap portions connected to the plates of one electrode unit and the other of said strap portions connected to the other electrode unit by turning said form box through 180° so that said connecting lugs of said plates are oriented downwardly and dipping said lugs into a mold filled with liquid lead so as to bond said lugs and form said bridge member; preparing a battery case having at least two adjacent cell chambers with a partition wall separating the two chambers, said partition wall having an upper edge with a cutout formed in said upper edge; introducing each of said electrode units into one of said chambers so that said one strap portion of said bridge member extends at one side of said partition wall, the other strap portion of said bridge member extends at the other side of said partition wall, and said center portion of said bridge member is aligned with said partition wall and extends with clearance through said cutout in said partition wall whereby that portion of said upper edge which is provided with said cutout extends into said groove and said clearance is provided between said groove and such portion of said upper edge; and introducing a bonding material into said clearance so as to completely fill said clearance and to thereby bond said center portion of said bridge member to said partition wall by simultaneously sealing said chambers from each other, said material introducing step including providing said partition wall with a filled-up part diametrically opposite said dove-tailed undercut.

2. A method of manufacturing a battery, comprising the steps of forming two electrode assembly units from a plurality of electrode plates, each of said plates being provided with a connecting lug, by aligning the respective plates of respective electrode units in a form box with said connecting lugs of said plates upwardly oriented and clamping said plurality of plates in said form box; forming an electrical connection between said electrode units, said electrical connection comprising an elongated electrically conductive bridge member having a center portion provided with an enlargement having a circumferential groove and strap portions at opposite sides of said center portion with one of said strap portions connected to the plates of one electrode unit and the other of said strap portions connected to the other electrode unit by turning said form box through 180° so that said connecting lugs of said plates are oriented downwardly and dipping said lugs into a mold filled with liquid lead so as to bond said lugs and form said bridge member; preparing a battery case having at least two adjacent cell chambers with a partition wall separating the two chambers, said partition wall having an upper edge with a cutout formed in said upper edge; introducing each of said electrode units into one of said chambers so that one strap portion of said bridge member extends at one side of said partition wall, the other strap portion of said bridge member extends at the other side of said partition wall, and said central portion of said bridge member is aligned with said partition wall and extends with clearance through said cutout in said partition wall whereby that portion of said upper edge which is provided with said cutout extends into said groove and said clearance is provided between said groove and such portion of said upper edge; subjecting a portion of said enlargement in the region of said groove to pressure so as to form a dove-tailed undercut in said groove; and introducing a bonding material into said clearance so as to completely fill said clearance and to thereby bond said center portion of said bridge member to said partition wall by simultaneously sealing said chambers from each other.

3. A method as defined in claim 2, wherein said connection forming step further comprises providing one strap portion connecting the positive or negative plates of the end cells of the battery case with an upstanding shaft which serves to form a terminal post of the battery.

4. A method as defined in claim 2, comprising the additional steps of welding onto said battery case a cover having an interior wall aligned with said partition wall of said battery case and welding terminal posts to said electrode units through said cover for exterior connection of said battery.

5. A method as defined in claim 2, wherein said bonding material is a plastic material and said material introducing step comprises injection molding said plastic material into said clearance to completely fill the cutout in said upper edge of said partition wall.

6. A method as defined in claim 2, further comprising the step of heating said bridge member prior to said material introducing step.

7. A method as defined in claim 2, wherein said battery case preparing step further comprises forming said cutout in said upper edge with a circumferential recess aligned with said partition wall and increasing the thickness of a portion of said partition wall at least in the region surrounding said recess in said cutout, said step of introducing said electrode units into the respective chambers further comprising inserting said portion of increased thickness into the groove of said enlarged portion of said bridge member so that the latter clampingly engages said portion of increased thickness, said clearance being provided between said groove and said recess.

8. A method as defined in claim 2, wherein said connection forming step further comprises providing a second portion of said groove with a second dove-tailed undercut and said material introducing step comprises providing said partition wall with a filled-up part diametrically opposite said second dove-tailed undercut.

* * * * *